United States Patent [19]
Bruederle et al.

[11] Patent Number: 5,957,410
[45] Date of Patent: Sep. 28, 1999

[54] EARTH ORIENTED SATELLITE AND PROCESS FOR CONTROLLING THE POSITION, NUTATION AND SPIN

[75] Inventors: Ernst Bruederle, Ottobrunn; Michael Surauer, Chieming; Walter Fichter, Taufkirchen, all of Germany

[73] Assignee: Daimler-Benz Aerospace AG, Germany

[21] Appl. No.: 08/658,264

[22] Filed: Jun. 5, 1996

[30] Foreign Application Priority Data

Jun. 9, 1995 [DE] Germany .............. 195 20 410

[51] Int. Cl.$^6$ .............. B64G 1/32; B64G 1/24
[52] U.S. Cl. .............. 244/166; 244/164; 244/170
[58] Field of Search .............. 244/164, 166, 244/170, 168, 173

[56] References Cited

U.S. PATENT DOCUMENTS

| | | | |
|---|---|---|---|
| 4,114,841 | 9/1978 | Muhlfelder et al. | 244/166 |
| 4,746,085 | 5/1988 | Bruderle | 244/166 |
| 4,776,540 | 10/1988 | Westerlund | 244/164 |
| 4,916,622 | 4/1990 | Raman et al. | 244/166 |
| 5,259,577 | 11/1993 | Achkar et al. | 244/164 |
| 5,269,483 | 12/1993 | Flament | 244/164 |
| 5,343,398 | 8/1994 | Goodzeit et al. | 244/164 |
| 5,413,293 | 5/1995 | Gomberg et al. | 244/166 |
| 5,540,405 | 7/1996 | Bender et al. | 244/166 |

FOREIGN PATENT DOCUMENTS

| | | |
|---|---|---|
| 0603869A1 | 6/1994 | European Pat. Off. . |
| 3606636 C1 | 11/1987 | Germany . |

OTHER PUBLICATIONS

"Optimal Periodic Control for Spacecraft Pointing and Attitude Determination", Journal of Guidance, Control and Dynamics, 16 (1993) Nov./Dec., No. 6, Washington, D.C.
"Microcomputer Based Adaptive Magnetic Attitude Control of a Spacecraft", 1987 IEEE, CH2461–2/87/0000/0487.
"Magnetic Attitude Control System for Spinning Small Spacecraft", 4th AIAA/USU Meeting, Aug. 27, 1990, Logan 2 (1990).

*Primary Examiner*—Virna Lissi Mojica
*Attorney, Agent, or Firm*—Evenson, McKeown, Edwards & Lenahan, P.L.L.C.

[57] ABSTRACT

A low earth orbiting satellite control arrangement according to the invention has an earth sensor for measuring roll and pitch of the satellite relative to an earth oriented moving reference system, a spin wheel mounted along an axis perpendicular to the orbital plane of the satellite for measuring spin of the satellite, and two magnet coils for generating control. A first of the two magnet coils is aligned substantially in parallel to a roll axis of the satellite, and the second is aligned substantially parallel to the yaw axis. Alternative control algorithms are disclosed for controlling attitude, nutation and spin of the satellite based on information from the earth sensor, spin wheel and an observer which is also mounted on the satellite.

3 Claims, 5 Drawing Sheets

5,957,410

EARTH ORIENTED SATELLITE AND PROCESS FOR CONTROLLING THE POSITION, NUTATION AND SPIN

BACKGROUND OF THE INVENTION

The present invention relates to a method and apparatus for earth oriented alignment of a satellite which is deployed in a relatively low earth orbit (substantially lower than the geostationary orbit), at a median inclination. "Median inclination" means that the three orthogonal components of the earth's magnetic field, expressed in an earth oriented moving orbit reference system, are generally nonzero.

Normally, the solar panels of a satellite are rotated and tilted toward the sun corresponding to the time of the day and year. Thus, relatively large deviation moments occur in the inertia sensor of the satellite which, in turn, results in very high disturbance torques because of the gravitation gradient.

Attitude control of a satellite in the above-described orbital path is normally carried out by means of reaction wheels and magnet coils. (Usually nozzles are used only for the spin discharge of the wheels.) Attitude control systems which operate only with wheels and magnet coils usually have three axis-related magnet coils. However, the technical publication by Fisher et al, "Magnetic Momentum Bias Attitude Control with Two Gimballed Appendages", 18th Annual AAS Guidance and Control Conference, Keystone, Colo., AAS Paper 95-005, discloses a process which requires only two magnetic coils, which are mounted along the x- and y-axes of the satellite.

The present invention also relates to a control arrangement which uses only two magnet coils. Control laws and strategies for disturbance compensation are discussed, however, which differ from those of Fisher et al, as well as an alternative arrangement of the magnet coils and the associated control processes, which achieve a clear improvement of the control action.

One object of the invention is to provide a process and apparatus for earth oriented control of a satellite, which requires only two magnet coils, a spin wheel and a two-axis measuring earth sensor.

In comparison to the prior art as exemplified by Fisher et al, the present invention differs in the following important respects:

i) The two magnet coils are preferably arranged along the satellite x- and z-axes.
ii) No magnetometer is used.
iii) For the satellite attitude and nutation control, not one, but both coils are used.
iv) Control laws are used which are adapted to the special magnet coil configuration and exhibit significant improvements with respect to previous processes.
v) Measures for disturbance compensation and the disturbance reduction are provided which also improve the control performance.

Points ii) to v) are advantageous not only in connection with a magnet coil configuration according to point i), but also in the case of the use of an x/y magnet coil configuration, as described by Fisher et al.

Other objects, advantages and novel features of the present invention will become apparent from the following detailed description of the invention when considered in conjunction with the accompanying drawings.

SATELLITE ORBIT AND EARTH MAGNETIC FIELD

Figure 1:
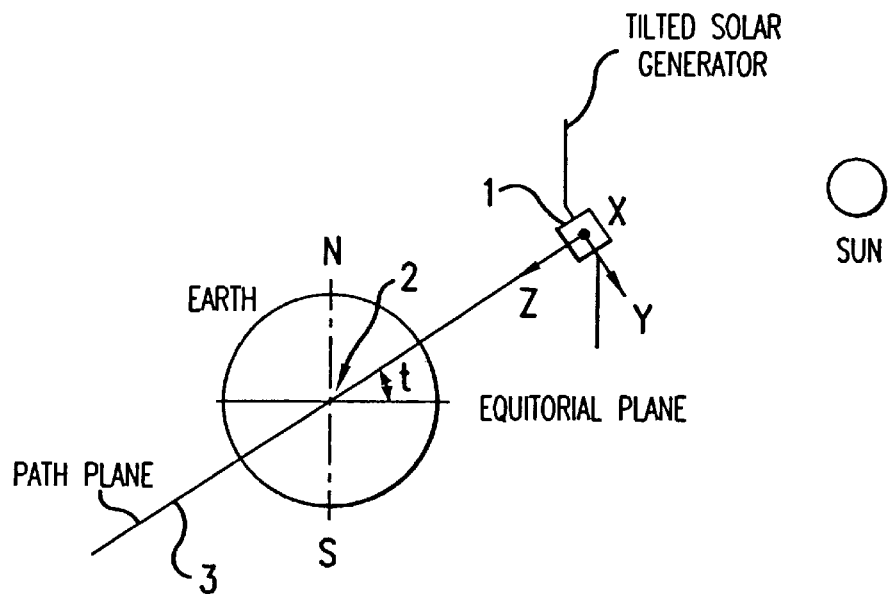
FIG. 1 is a schematic illustration of the satellite orbit and orientation of the reference systems axes.
Figure 2:
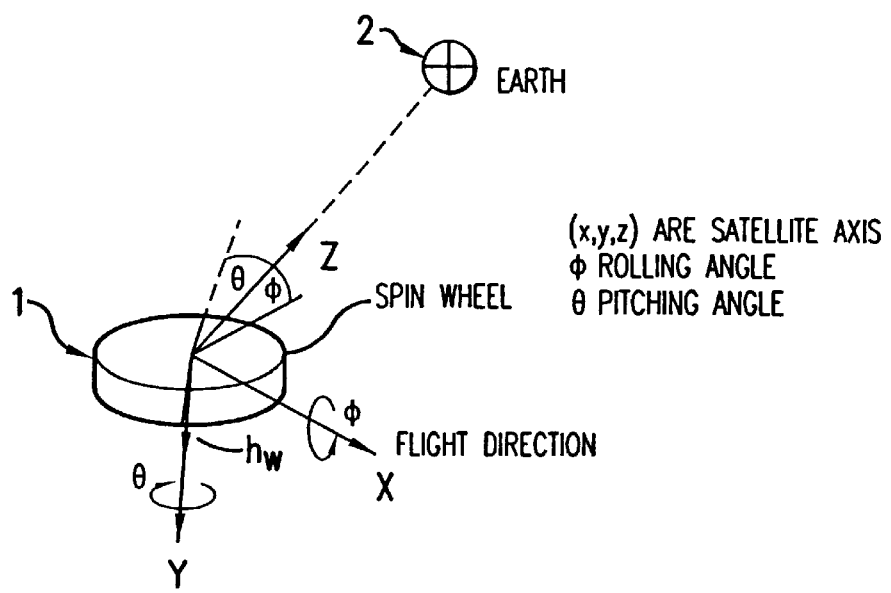
FIG. 2 is a schematic illustration which shows the satellite pitch and roll axes, as well as its spin vector.

The invention is based on an approximately circular satellite orbit with a path inclination such as is illustrated in FIG. 1. A orbit reference system ($x_R$, $y_R$, $z_R$) is defined by a system of coordinates which has its origin at the momentary position of the satellite 1. As shown in FIGS. 1 and 2, the $z_R$-axis points to the earth center 2, while the $x_R$-axis (indicated by a dot in FIG. 1) points in the flight direction of the satellite 1, and the $y_R$-axis is disposed perpendicularly on the orbit plane 3, which is represetned by a line in FIG. 3.

The earth's magnetic field can be expressed approximately in the reference coordinates ($x_R$, $y_R$, $z_R$) as $$b_R = \begin{pmatrix} -B_0 \sin i \cos\eta \\ B_0 \cos i \\ -2B_0 \sin i \sin\eta \end{pmatrix} \quad (1)$$

wherein $B_0$ is a constant quantity, i is the orbit inclination and $\eta$ is the orbit angle of the satellite, normally counted from ascending nodes of the orbit. All three components of the earth's magnetic field are generally nonzero. (The described dipole model of the earth's magnetic field represents a rough approximation of the earth's actual magnetic field; however, it is sufficiently precise for the following explanations.)

A two-axis measuring earth sensor mounted in the direction of the satellite z-axis measures attitude deviations with respect to the earth orientation. That is, it determines roll (angle $\phi$ about the x-axis) and pitch (angle $\theta$ about the y-axis) relative to the reference system ($x_R$, $y_R$, $z_R$) as shown in FIG. 2 (See also FIG. 5).

Correspondingly, a spin wheel is mounted along the satellite y-axis. (In the nominal case, therefore, it is disposed perpendicularly to the orbit plane.) It is operated with a spin bias $h_w < 0$ which is nominally nonzero, and furnishes information concerning the wheel speed or the wheel spin.

Figure 3A:
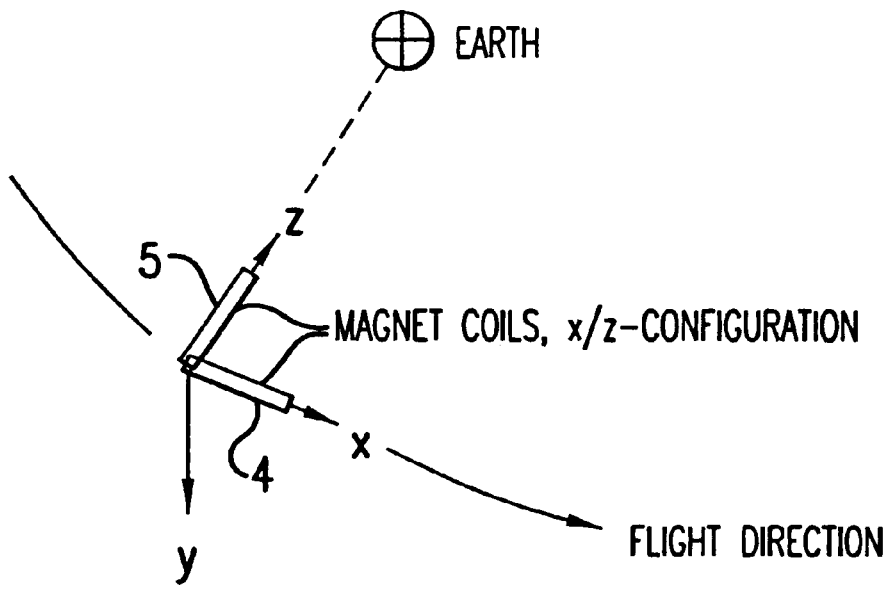
FIG. 3 shows the orientation of the magnet coils.
Figure 3B:
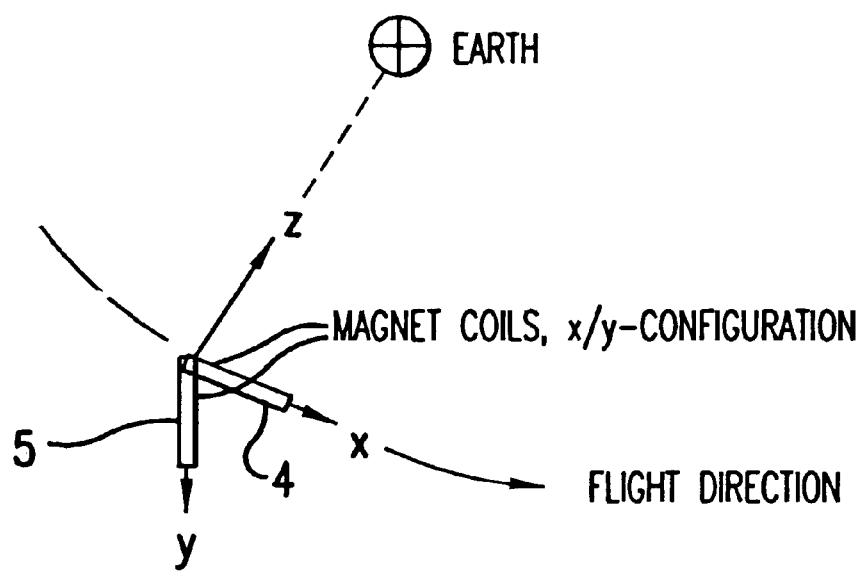

Two magnet coils 4, 5 are used, and are oriented in one of two possible configurations, as shown in FIG. 3. These alternative configurations are:

1) Arrangement along the satellite x- and y-axis
2) Arrangement along the satellite x- and z-axis Which of the two configurations is selected depends on the size of the y-component of the magnetic field $b_R$. If it is large enough, configuration 2 is selected. This will be discussed in detail below.

By means of the magnet coils, a torque $\tau$ $$\tau = -\tilde{b}m \quad (2)$$

may be applied to the satellite, wherein b is the (3×1) vector of the earth's magnetic field, and m is the (3×1) vector of the magnetic moment of the coils (current), both expressed in satellite coordinates. The matrix $\tilde{b}$ is the cross product matrix $$\tilde{b} = \begin{pmatrix} 0 & -b_z & b_y \\ b_z & 0 & -b_x \\ -b_y & b_x & 0 \end{pmatrix}. \tag{3}$$

For arrangement 1 (above), the z-component of the magnetic moment $m_z=0$; for arrangement 2, $m_y=0$.

For small deviations of the satellite from the reference system ($x_R$, $y_R$, $z_R$), $b_R \approx b$, and therefore $$\tau \approx -\tilde{b}_R m. \tag{4}$$

Since all three components $b_x$, $b_y$, $b_z$ of the earth's magnetic field are generally nonzero, a control moment generated by the magnet coils always causes a coupling of all three satellite axes.

In the following, the attitude movement of the satellite is not described as a differential equation of the 2nd order in the deviation angles $\phi=(\Phi, \theta, \psi)^T$, as is customary, but rather by means of the following equations:

$$I\dot{\omega}+\omega(I\omega+h)=\tau-\tau_m \tag{5}$$

$$\dot{h}_0+\omega_0 h_0=\tau_0 \tag{6}$$

$$\dot{h}_0=\tau_m. \tag{7}$$

Wherein:

I=inertia tensor of the satellite;

$\omega$=(3×1) vector of the inertial rotating speeds, expressed in satellite coordinates;

$\omega_0$=(3×1) vector of the orbit rotating rate, $\omega_0=(0,-c_0, 0)^T$ with $c_0>0$;

h=(3×1) vector of the wheel spin, h=(0, $-h_w$, 0)$^T$, with $h_w>0$;

$h_0$=(3×1) vector of the whole satellite spin, expressed in the reference system ($x_R$, $y_R$, $z_R$);

$\tau$=(3×1) vector of the outer torques, expressed in satellite coordinates;

$\tau_0$=(3×1) vector of the outer torques, expressed in the reference system ($x_R$, $y_R$, $z_R$); and $\tau_m$=(3×1) vector of the engine torque of the spin wheel, $\tau_m=(0,-\tau_w, 0)^T$.

The following assumptions will now be made:

$$h >> I\omega \tag{8}$$

$$I = \begin{bmatrix} I_x & 0 & 0 \\ 0 & I_y & 0 \\ 0 & 0 & I_z \end{bmatrix}. \tag{9}$$

Assumption (8) is always true for earth oriented satellites, because the inertial rotating rates are very low. Assumption (9) is not always satisfied; however, the inertia tensor can be described in an approximate manner according to assumption (9), because the diagonal elements of I dominate. Secondary diagonal elements result in a coupling of the coordinates, but do not change the basic design concept.

The 1st and 3rd line of expressions (5) and (6) result in $$\begin{pmatrix} \dot{\omega}_x \\ \dot{\omega}_z \end{pmatrix} = \begin{bmatrix} 0 & -h_w/I_x \\ h_w/I_z & 0 \end{bmatrix} \begin{pmatrix} \omega_x \\ \omega_z \end{pmatrix} + \begin{bmatrix} 1/I_x & 0 \\ 0 & 1/I_z \end{bmatrix} \begin{pmatrix} \tau_x \\ \tau_z \end{pmatrix} \tag{10}$$

$$\begin{pmatrix} \dot{h}_{0x} \\ \dot{h}_{0z} \end{pmatrix} = \begin{bmatrix} 0 & c_0 \\ -c_0 & 0 \end{bmatrix} \begin{pmatrix} h_{0x} \\ h_{0z} \end{pmatrix} + \begin{bmatrix} 1 & 0 \\ 0 & 1 \end{bmatrix} \begin{pmatrix} \tau_{0x} \\ \tau_{0z} \end{pmatrix}. \tag{11}$$

Equation (10) describes the nutation movement. With the prerequisite of a completely damped nutation (that is $\omega=0$), equation (11) describes the rolling/yawing attitude movement of the satellite since $$h_0=[E+\phi](I\omega+h) \tag{12}$$

from which, for the x- and z-components of $h_0$ for $\omega=(0\ 0\ 0)^T$, it follows that $$h_{0x}=\psi h_w \tag{13}$$

$$h_{0z}=\psi h_w \tag{14}$$

The second line of expression (7) results in $$\dot{h}_w=\tau_w \tag{15}$$

and, taking into account $\omega_y=\theta-c_0$, the second line of expression (5) results in $$\begin{pmatrix} \dot{\theta} \\ \ddot{\theta} \end{pmatrix} = \begin{bmatrix} 0 & 1 \\ 0 & 0 \end{bmatrix} \begin{pmatrix} \theta \\ \dot{\theta} \end{pmatrix} + \begin{pmatrix} 0 \\ 1/I_y \end{pmatrix} (\tau_y + \tau_W). \tag{16}$$

The equations (10), (11), (15) and (16) can now be combined yield to the system equation.

$$\begin{pmatrix} \dot{\omega}_x \\ \dot{\omega}_z \\ \dot{h}_{0x} \\ \dot{h}_{0z} \\ \dot{\theta} \\ \ddot{\theta} \\ \dot{h}_w \end{pmatrix} = \begin{bmatrix} 0 & -\frac{h_w}{I_x} & 0 & 0 & 0 & 0 & 0 \\ \frac{h_w}{I_z} & 0 & 0 & 0 & 0 & 0 & 0 \\ 0 & 0 & 0 & c_0 & 0 & 0 & 0 \\ 0 & 0 & -c_0 & 0 & 0 & 0 & 0 \\ 0 & 0 & 0 & 0 & 0 & 1 & 0 \\ 0 & 0 & 0 & 0 & 0 & 0 & 0 \\ 0 & 0 & 0 & 0 & 0 & 0 & 0 \end{bmatrix} \begin{pmatrix} \omega_x \\ \omega_z \\ h_{0x} \\ h_{0z} \\ \theta \\ \dot{\theta} \\ h_w \end{pmatrix} + \tag{17}$$

$$\begin{bmatrix} 1/I_x & 0 & 0 & 0 \\ 0 & 0 & 1/I_z & 0 \\ 1 & 0 & 0 & 0 \\ 0 & 0 & 1 & 0 \\ 0 & 0 & 0 & 0 \\ 0 & 1/I_y & 0 & 1/I_y \\ 0 & 0 & 0 & 1 \end{bmatrix} \begin{pmatrix} \tau_x \\ \tau_y \\ \tau_z \\ \tau_w \end{pmatrix}$$

Expression (17) shows that the nutation movement, the spin or (roll/yaw attitude) movement, the pitching movement and the movement of the wheel momentum are decoupled from one another.

Figure 4:
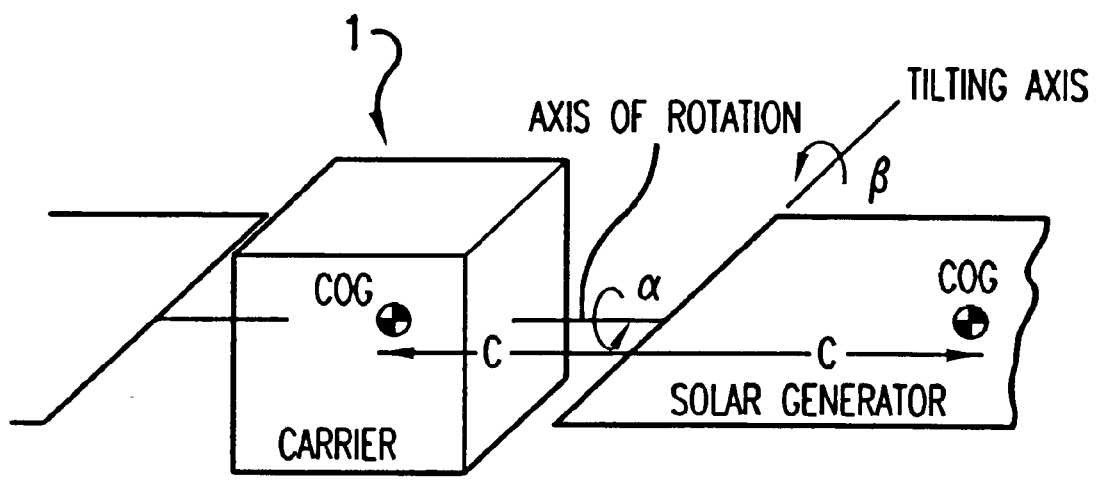
FIG. 4 is a schematic illustration which shows the rotation and tilting angles of the spacecraft.

The external torque $\tau \approx (\tau_x, \tau_y, \tau_z)^T$ is composed of the adjusting torque $\tau_c$ of the control and a disturbance torque attributable to external disturbances. The dominant contribution of the external disturbance torques is the result of gravitation gradients because, for satellites orbits such as those considered here, the solar panels not only are rotated about the angle $\alpha$, but must also be tilted about the angle $\beta$, as shown in FIG. 4. For this configuration, the following is obtained as the (attitudent-independent) disturbance torque $$\tau_D = 3c_0^2 \begin{pmatrix} -I_{yz} \\ I_{xz} \\ 0 \end{pmatrix} \quad (18)$$

with $$I_{yz} = 2 \cdot \cos \alpha [(I_{Fy} - I_{Fz} - c^2 m_F) \sin \beta \cos \beta - lcm_F \sin \beta] \quad (19)$$

$$I_{xz} = \sin 2\alpha [-I_{Fx} + I_{Fy} \sin^2 \beta + I_{Fx} \cos^2 \beta - \sin^2 \beta c^2 m_F] \quad (20)$$

in which $I_{Fx}$, $I_{Fy}$, $I_{Fz}$ indicate the main moments of inertia of the solar panel; $m_F$ indicates the mass of a solar panel; $\alpha$ is the rotating angle; $\beta$ is the tilt angle of a solar panel; and l and c are distances. See FIG. 4.

The angle $\alpha$ changes corresponding with the speed $c_0$ (orbit rotating rate) of the satellite; that is $2\pi$ per orbit. The angle $\beta$ changes only seasonally, corresponding to the position of the sun, and can therefore be considered to be constant for an orbit.

For a typical satellite configuration $I_{yz} > I_{xz}$ so that the largest contribution of the disturbance torque acts about the x-axis of the satellite.

Corresponding to representation (17) of the plant, in the case of the attitude control, a differentiation can be made between the following partial controllers:
nutation control for $\omega_x$, $\omega_z$
momentum control for $h_{0x}$, $h_{0z}$ corresponds to an attitude controller for roll and yaw
controller for discharging the wheel spin $h_w$
control for the pitch angle $\theta$.

The pitch controller uses the earth sensor for measuring the pitch angle, and the momentum wheel as the control element. A conventional PD- or PID-controller is used, which will not be further described.

The wheel momentum is controlled by measuring the speed information furnished by the momentum wheel. Magnet coils are used as control elements. The nutation controller and the momentum controller for $h_{0x}$, $h_{0z}$ use the roll angle measurement of the earth sensor and an observer for estimating $\omega_z$ and $h_{0x}$. Magnet coils are also used as control elements.

In addition to using the above-mentioned partial controllers, known disturbance quantities are compensated to the extent possible directly by means of magnet coils.

Figure 5:
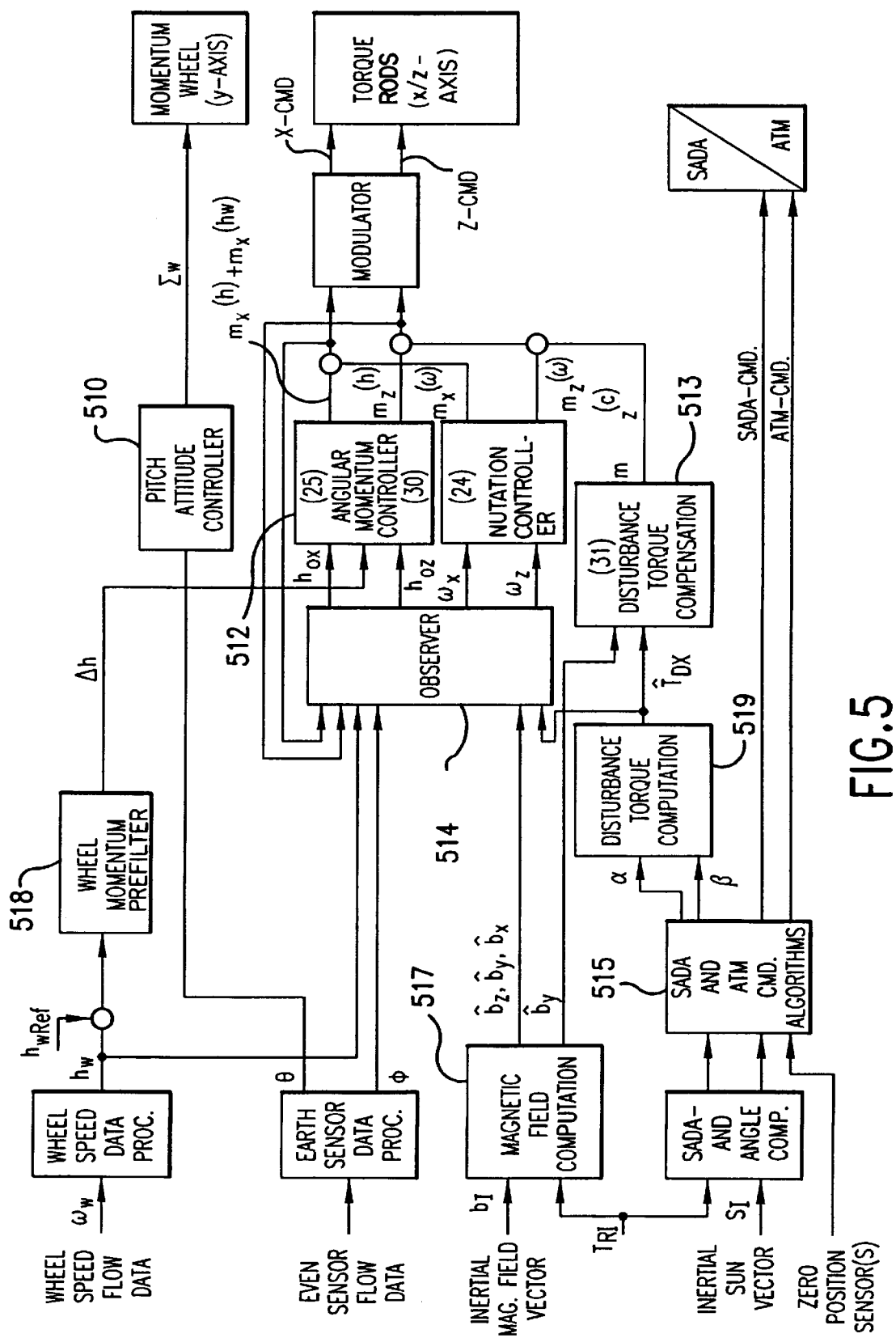
FIG. 5 is a block diagram which illustrates the overall configuration of the control arrangement according to the invention.

FIG. 5 is an overview of the overall control arrangement according to the invention. Here, a distinction is made between pitch-attitude control 510, nutation control 511 and momentum control 512. (Momentum control consists of the control of ($h_{0x}$, $h_{0z}$) and of the wheel momentum control.) The following is a description of the schematically depicted functional blocks and the respective signal quantities shown in FIG. 5.

For the magnet coils in the x/z-configuration, the relationship between the magnetic moment $(m_x\ m_z)^T$ and the control moment $\tau_c$ is as follows. (See expressions (3), (4).)

$$\begin{pmatrix} \tau_{cx} \\ \tau_{cy} \\ \tau_{cz} \end{pmatrix} = \begin{bmatrix} 0 & -b_y \\ -b_z & +b_x \\ +b_y & 0 \end{bmatrix} \begin{pmatrix} m_x \\ m_z \end{pmatrix}. \quad (21)$$

The magnetic field components, $\tilde{b}_x$, $\tilde{b}_y$, and $\tilde{b}_z$ are output from the magnetic field computation block 517 in FIG. 5.

The magnetic moment $(m_x, m_z)^T$ is composed of several components, corresponding to the different partial controllers. The following applies $$\begin{pmatrix} m_x \\ m_z \end{pmatrix} = \begin{pmatrix} m_x^{(h)} \\ m_z^{(h)} \end{pmatrix} + \begin{pmatrix} m_x^{(\omega)} \\ m_z^{(\omega)} \end{pmatrix} + \begin{pmatrix} m_x^{(hw)} \\ 0 \end{pmatrix} + \begin{pmatrix} 0 \\ m_z^{(c)} \end{pmatrix} \quad (22)$$

wherein the indices h, $\omega$, $h_w$ and c (also reflected in FIG. 5) stand for the momentum control, the nutation control, the wheel momentum control and the disturbance quantity compensation. The different proportions are described below.

When first only the x/z-partial system is considered, the following is obtained $$\begin{pmatrix} \tau_{cx} \\ \tau_z \end{pmatrix} = \begin{bmatrix} 0 & b_y \\ -b_y & 0 \end{bmatrix} \begin{pmatrix} m_x \\ m_z \end{pmatrix}. \quad (23)$$

Although the component $b_y$ of the magnetic field (output from the magnetic field computation block 517 in FIG. 5) is much smaller than $b_z$ and also than $b_x$—particularly if it is taken into account that the dipole axis of the magnetic field does not stand perpendicularly on the equatorial plane but is tilted by approximately 11° with respect to it (that is, $b_{Rymin} = B_0 \cos(i+11°)$ in the worst case)—$b_y$ can be considered as approximately constant because the preceding sign does not change. Therefore, for control of the x/z movement (nutation and attitude), a simple linear control law may be used:

$$\begin{pmatrix} m_x^{(\omega)} \\ m_z^{(\omega)} \end{pmatrix} = \underbrace{\begin{pmatrix} k_{11}^{(\omega)} & k_{13}^{(\omega)} \\ k_{31}^{(\omega)} & k_{33}^{(\omega)} \end{pmatrix}}_{K^{(\omega)}} \begin{pmatrix} \omega_x \\ \omega_z \end{pmatrix} \quad (24)$$

for the nutation, and for the attitude $$\begin{pmatrix} m_x^{(h)} \\ m_z^{(h)} \end{pmatrix} = \underbrace{\begin{pmatrix} k_{11}^{(h)} & k_{13}^{(h)} \\ k_{31}^{(h)} & k_{33}^{(h)} \end{pmatrix}}_{K^{(h)}} \begin{pmatrix} h_{0x} \\ h_{0z} \end{pmatrix}. \quad (25)$$

In order to avoid excessively large control quantities during the nutation damping, $K^{(\omega)}$ is selected to be $$K^{(\omega)} = \begin{pmatrix} 0 & 0 \\ k_{31}^{(\omega)} & 0 \end{pmatrix} \begin{pmatrix} \omega_x \\ \omega_z \end{pmatrix} \quad (26)$$

which results only in a damping of the nutation movement and does not increase the cut-off frequency.

When only the attitude movement of the isolated x/z partial system is considered, the following is obtained as the transfer function of the closed control loop $$\begin{pmatrix} h_{0x} \\ h_{0z} \end{pmatrix} = \begin{bmatrix} s + b_y k_{13}^{(h)} & c_0 + b_y k_{33}^{(h)} \\ -(c_0 + b_y k_{11}^{(h)}) & s - b_0 k_{31}^{(h)} \end{bmatrix} \frac{1}{det} \tau_D \quad (27)$$

$$det = \tag{28}$$
$$s^2 + sb_y(k_{13}^{(h)} - k_{31}^{(h)}) + c_0^2 + c_0 b_y(k_{11}^{(h)} + k_{33}^{(h)}) + b_y^2(k_{11}^{(h)} k_{33}^{(h)} - k_{31}^{(h)} k_{13}^{(h)})$$

Since the largest disturbance torque has its effect in the x-axis, advantageously $k_{11}^{(h)}=0$ is selected in order to minimize the influence on $h_{0z}$ (that is, on the roll angle $\phi$). The following will then be obtained for $$K^{(h)} = \begin{bmatrix} 0 & k_{13}^{(h)} \\ k_{31}^{(h)} & k_{33}^{(h)} \end{bmatrix} \tag{29}$$

In expression (21), it is shown that the control element activity in $(m_x, m_z)^T$ controls not only the x/z-movement, but also couples into the y-axis by way of the components $b_z, b_x$, thus causing a change of the wheel momentum.

The wheel momentum is also controlled by means of the magnet coils, for which preferably the x-coil is used because it causes only a coupling into the z-axis (by way of $b_y$) and not into the x-axis where the disturbance torque is already very large.

The control law is as follows:

$$m_x^{(hw)} = \frac{\hat{b}_z}{\hat{B}_z^2}\left(k_p + \frac{k_I}{s}\right)(h_w - h_{wRef}) \tag{30}$$

in which the integral proportion k/s is important (See subtractor unit 520 in FIG. 5.). As a result, the wheel spin $h_w$ is relatively well controlled but the controller amplification remains relatively low. That is, the wheel momentum control interferes only relatively little with the x/z attitude control. This weak disturbance is obtained at the price of slower dynamics in the wheel spin control loop which, however, in practice can be taken into account by slower starting operations. The quantity $b_z$ stands for the estimated x-component of the magnetic field, expressed in the reference system ($x_R$, $y_R$, $z_R$). It is determined by a corresponding magnetic field model which is computed on board the satellite.

As shown in FIG. 5, the control laws (24) and (25) require not only the speed $\omega_x$ and $h_{0z}$ (that is, the attitude $\phi$) as the input quantity but also the speed $\omega_z$ and the spin $h_{0x}$ (that is, the attitude $\psi$). If, in addition, sensors for the measurement of the last two quantities do not exist, they are estimated by an observer (Block 514 in FIG. 5). This is always possible because the observability is always ensured by the coupling of the x- and z-axis by the wheel momentum.

The dominant disturbance by the gravitation gradient affects the satellite x-axis. The disturbance in the y-axis is much smaller (see equations (18), (19), (20)) and can also be easily controlled by means of the momentum wheel.

The x-disturbance (Block 513 in FIG. 5) is directly compensated by $$m_x^{(c)} = \frac{\hat{\tau}_{Dx}}{b_y} \tag{31}$$

$$m_x^{(c)} = 0 \tag{32}$$

wherein $\tau_{Dx}$ (output from Disturbance Torque Computation Block 519 in FIG. 5) can be computed on board the satellite by means of (18) and (19), because the measuring values of $\alpha$ and $\beta$ are supplied by the rotating and tilting mechanism of the solar generator. (See block 515 in FIG. 5.)

Figure 6:
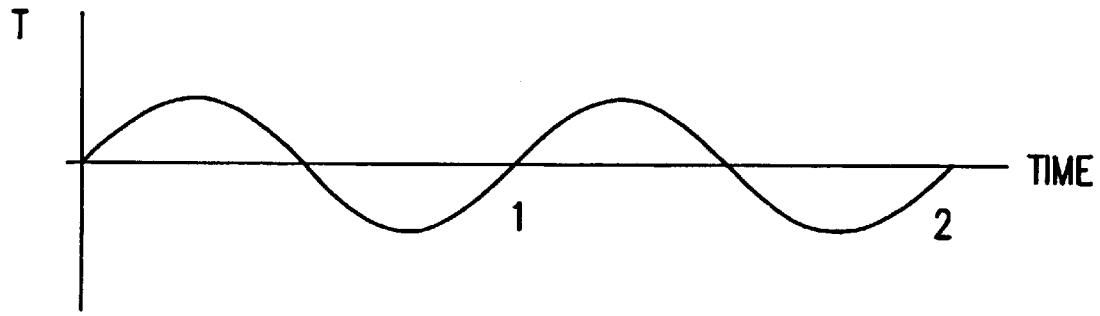
FIG. 6 shows the disturbance torque in the roll and gravitation gradient.

In the case of uniform rotation of the solar generators with $\alpha=c_0$, a sinusoidal disturbance torque $\tau_{Dx}$ about the x-axis is obtained, as shown in FIG. 6.

Figure 7:
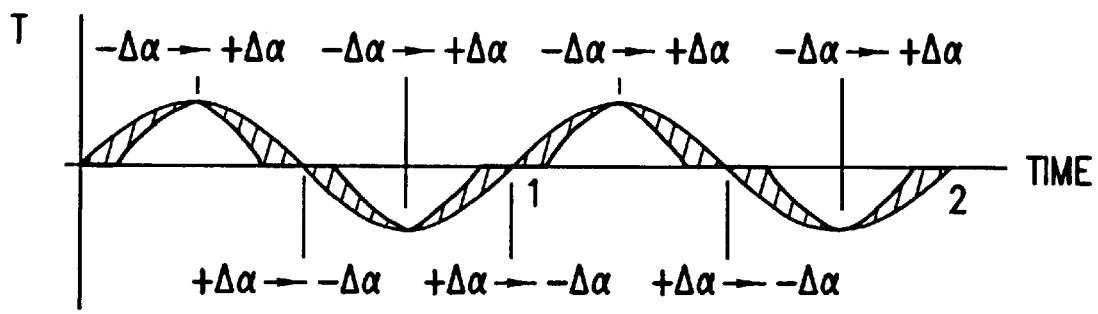
FIG. 7 shows the effect of disturbance quantity reduction.

If the solar generators are stopped near the zero passages and an area of the extremes is rotated significantly faster, a disturbance torque profile about the x-axis such as shown in FIG. 7 is obtained. Between the extremes and the stopping points, there will then be an angle of $+\Delta\alpha$, while between the stopping points and the extremes, there will be an angle of $-\Delta\alpha$, relative to the normal angle of rotation $\alpha$.

Although this approach does not reduce the maximum of the disturbance torque, the time integral of the disturbance decreases considerably, which significantly improves the control performance.

For the magnet coils in the x/y-configuration, the following relationship exists between the control moment $\tau_0$ and the magnetic moment $(m_x, m_y)$:

$$\tau_c = \begin{pmatrix} 0 & b_z \\ -b_z & 0 \\ b_y & -b_x \end{pmatrix}\begin{pmatrix} m_x \\ m_z \end{pmatrix}. \tag{33}$$

Thus the x- and the z-axis are directly coupled by the (3,2) element $-b_x$ of the control matrix. First, the control of the spin (attitude) $h_0$ and of the wheel spin $h_w$ will be considered in a combined form.

By means of the control law $$\begin{pmatrix} m_x^{(h)} \\ m_y^{(h)} \end{pmatrix} = E\, K^{(h)} \begin{pmatrix} h_{0x} \\ \Delta h \\ h_{0z} \end{pmatrix} \tag{34}$$

and the abbreviations $$E = \begin{pmatrix} 1 & b_x/b_y \\ 0 & 1 \end{pmatrix} \tag{35}$$

$$K^{(h)} = \begin{pmatrix} k_{11} & k_{12} & k_{13} \\ k_{21} & k_{22} & k_{23} \end{pmatrix} \tag{36}$$

$$\Delta h = \left(k_p + \frac{k_I}{s}\right)(h_w - h_{wRef}) \tag{37}$$

a direct decoupling of the x- and z-axis can be achieved. (See Block 518, from which $\Delta h$ is output in FIG. 5.)

By means of expressions (33), (34), (35), the following is obtained $$\tau = \begin{pmatrix} 0 & & -b_z \\ -b_z & & -\dfrac{b_x b_z}{b_y} \\ -b_y & & 0 \end{pmatrix} K^{(h)} \begin{pmatrix} h_{0x} \\ \Delta h \\ h_{0z} \end{pmatrix}. \tag{39}$$

Under this control law, the x- and z-axes are therefore not coupled directly but by way of the y-axis.

If now, for the design operation, first only the x/z partial system is considered, the following transfer function is obtained for the closed control loop $$\begin{pmatrix} h_{0x} \\ h_{0z} \end{pmatrix} = \begin{pmatrix} s+b_y k_{13} & c_0 - b_z k_{23} \\ -(c_0 + b_y k_{11}) & s + b_z k_{21} \end{pmatrix} \frac{1}{det} \tau_D \quad (40)$$

$$det = s^2 + s(b_y k_{13} + b_z k_{21}) + c_0^2 c_0(b_y k_{11} - b_z k_{23}) + b_y b_z(k_{13} k_{21} - k_{11} k_{23}) \quad (41)$$

For the same reasons as in the x/z-configuration of the magnet coils, normally $k_{11}$ is selected to be $=0$. The quantity $k_{13}$ is selected as a constant because it enters with the factor $b_y$ in expression (40).

By selecting $$k_{23} = \hat{k}_{23} \frac{\hat{b}_z}{B_z^2}, \quad \hat{k}_{23} \text{ constant} \quad (42)$$

$$k_{21} = \hat{k}_{21} \frac{\hat{b}_z}{B_z^2}, \quad \hat{k}_{21} \text{ constant} \quad (43)$$

on the average not only the damping of the closed loop (40), but also the cut-off frequency, can be influenced. $B_z$, in this case, means the maximum of $\hat{b}_z(t)$ over the time.

The filtered deviation of the wheel spin $\Delta$ h from the wheel momentum prefilter 518 of FIG. 5 is controlled by way of the x-coil; therefore $k_{22}=0$ and $$k_{12} = \frac{\hat{b}_z}{B_z^2}. \quad (44)$$

As in the case of the x/z configuration of the magnetic coils, $k_y$, $k_f$ in (37) are selected so that the control loop of the wheel momentum interferes with the x/z movement as little as possible.

Nutation is controlled (Block 511 in FIG. 5) only by means of the y-coil; that is, $$\begin{pmatrix} m_x^{(\omega)} \\ m_y^{(\omega)} \end{pmatrix} = \begin{pmatrix} 0 & 0 \\ -k_1 & -k_2 \end{pmatrix} \begin{pmatrix} \omega_x \\ \omega_z \end{pmatrix} \quad (45)$$

wherein the controller amplifications $k_1$, $k_2$ depend on the earth's magnetic field $$k_1 = \frac{\hat{b}_z}{B_z^2} \hat{k}_1 \quad (46)$$

$$k_2 = \frac{\hat{b}_x}{B_x^2} \hat{k}_2 \quad (47)$$

with $I_z = I_x$ and $\hat{k}_2 = -\hat{k}_1 = k < 0$. This leads to a characteristic polynomial of the closed nutation control loop in the form $$s^2 + ks + \frac{h_w^2}{I_x^2} = 0. \quad (48)$$

That is, the inherent values are time variable, and the control causes only a damping but no increase of the cut-off frequency.

A nutation control of this type is described in the prior art, such as for example, H. Hablani, "Comparative Stability Analysis and Performance of Magnetic Controllers for Momentum Bias Satellites," AAS Paper 93-278.

As the overall magnetic moment of the control, the following is obtained $$\begin{pmatrix} m_x \\ m_y \end{pmatrix} = \begin{pmatrix} m_x^{(h)} \\ m_y^{(h)} \end{pmatrix} + \begin{pmatrix} m_x^{(\omega)} \\ m_y^{(\omega)} \end{pmatrix}. \quad (50)$$

The control quality is essentially impaired by the x-disturbance torque because, on the one hand, it is larger than the y-component of the disturbance torque, and on the other hand, it must not be compensated by means of the wheel momentum but by means of the y magnet coil and the z-component of the earth's magnetic field. See expression (39).

An unfavorable configuration, with respect to control quality, will exist when, in the case of a relatively large x disturbance torque, a small $b_z$-component (and therefore a small x-component of the control moment) exists. The worst case exists for a phase angle of 90° between $b_z$ and $\tau_x$; that is $$b_z = B_z \sin \eta \quad (51)$$

and $$\tau_{Dx} = \hat{\eta}_x \cos \tau = \hat{\tau}_x \sin (\eta + 90°). \quad (52)$$

If the y-coil is now acted upon by a constant value my (p), which corresponds to an "artificial" disturbance torque with the same phase as $b_z$, the following overall disturbance torque is obtained about the x-axis:

$$\tau_{Dx}^* = \hat{\tau}_x^* \sin (\eta + \phi) \quad (53)$$

with $$\hat{\tau}_{Dx}^* = \sqrt{(B_z m_y)^2 + \hat{\tau}_{Dx}^2} \quad (54)$$

$$\phi = \tan^{-1} \frac{\hat{\tau}_x}{B_z m_y}. \quad (55)$$

That is, although the amplitude of the new overall disturbance torque $\tau_{Dx}^*$ is larger than that of the original disturbance torque $\tau_{Dx}$, the phase position can be influenced in a targeted manner, which results in a clear improvement of the control quality.

Example: If the amount of the disturbance torque is increased by $\sqrt{2}$, the phase is shifted by 45°.

Start (50) will now be obtained as the overall magnetic control moment $$\begin{pmatrix} m_x \\ m_y \end{pmatrix} = \begin{pmatrix} m_x^{(h)} \\ m_y^{(h)} \end{pmatrix} + \begin{pmatrix} m_x^{(\omega)} \\ m_y^{(\omega)} \end{pmatrix} + \begin{pmatrix} 0 \\ m_y^{(F)} \end{pmatrix}. \quad (56)$$

The following summarizes the most important characteristics of the control arrangement according to the invention.

Assumptions with Respect to the Satellite Configuration

Orbit with median path inclination (that is, all 3 components of the earth magnetic field are generally nonzero.

For reasons of the energy supply of the satellite, the solar panels are rotated and tilted so that the largest (dominant) disturbance torques are caused because of the deviation moments and the gravitation gradient.

Instrumentation

For controlling the attitude and the wheel spin of the satellite, the following components are used:

2-axis earth sensor spin wheel in y-axis 2 magnet coils, preferably in the x/z configuration alternatively in the x/y configuration satellite computer with a orbit model and an earth magnetic field model as well as the control algorithms.

Object

Earth oriented alignment of the satellite about all three axes and control of the wheel momentum with respect to the reference value $h_{wRef}$. All three axes as well as the wheel momentum control are coupled with one another by means of the magnet coil control. Disturbance torques act mainly along the x and y axes, caused by the gravitation gradient.

Algorithms a) x/z Configuration of the Magnet Coils

Momentum controller (attitude controller) so that $k_{11}=0$ $b_y(k_{13}-k_{31})=2D\omega_0$ $c_0^2+c_0 b_y k_{33}-b_y^2 k_{13} k_{31}=\omega_0^2$ wherein D and $\omega_0$ describe the desired damping and angular velocity of the closed x/z attitude control loop.

Wheel momentum control by means of a PI regulator for minimizing the disturbance to the x/z attitude control loop Disturbance quantity compensation about the x-axis Disturbance quantity reduction by shifting the actual angle of rotation of the solar generator with respect to the nominal angle of rotation Observer for estimating the yaw angle and the yaw speed.

b) x/y Configuration of the Magnet Coils

Approximate decoupling of the x- and z-axis by the decoupling matrix E

Controller for attitude and wheel momentum with the gains $k_{11}=0$ $k_{23}=\hat{k}_{23}\hat{b}_z/B_z^2$ $k_{21}=\hat{k}_{21}\hat{b}_z/B_z^2$ wherein $k_{13}$, $\hat{k}_{21}$ and $\hat{k}_{23}$ are determined such that the following applies:[1]

[1] This is the result of (41) with det $\approx(s^2)+2D(\omega_0).s+(\omega_0^2)$ as well as (43), in which case the factor ½ is obtained by taking the mean of the term $b\hat{z}bz/Bz2$ over one orbit.

$b_y k_{13}+½\hat{k}_{21}=2D\omega_0$ $c_0^2-½\hat{k}_{23}+b_y k_{13}½\hat{k}_{21}=\omega_0^2$ Wheel momentum control by means of a PI-controller for minimizing the disturbance exercised on the x/z attitude control loop and a control by way of the x coil with $k_{22}=0$ $k_{12}=\hat{b}_z/B_z^2$ Observer for estimating the yaw speed and yaw rate as in the case of the x/z coil configuration Disturbance quantity reduction as in the case of the x/z coil configuration.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Process for controlling attitude, nutation and momentum of a satellite orbiting in a low earth orbit, with a medium inclination in an earth oriented alignment, said satellite being of the type having an earth sensor for measuring in two axes; a spin wheel having an axis of rotation oriented in parallel to a pitch axis of the satellite and two magnet coils for generating control moments, a first one of the two magnet coils being aligned substantially in parallel to a roll axis of the satellite and a second one of the two magnet coils being aligned substantially in parallel to a yaw axis of the satellite, said process comprising at least one of the steps of:

controlling attitude and nutation of said satellite by activating said magnet coils based on a linear control algorithm which in the case of attitude control is a function of a roll angle measured by the earth sensor and of a yaw angle estimated by means of an observer or measured by an additional sensor on said satellite and, in the case of nutation control, a function of a roll angle chance determined by earth sensor measurements and a yaw angle chance estimated by the observer or measured by an additional sensor; and controlling wheel spin by activation of at least said first magnet coil, as a function of a deviation from a desired value for spin, and of a yaw component of th earth's magnetic field based on PI feedback control;

wherein said linear control algorithm for attitude control is given by $$\begin{bmatrix} m_x^{(h)} \\ m_z^{(h)} \end{bmatrix} = \begin{bmatrix} K_{11}^{(h)} & K_{13}^{(h)} \\ K_{31}^{(h)} & K_{33}^{(h)} \end{bmatrix} \begin{bmatrix} h_{ox} \\ h_{oz} \end{bmatrix}$$

$m_x^{(h)}$, $m_z^{(h)}$ being the magnetic moments to be generated by the roll and yaw axis magnet coils; $h_{ox}$, $h_{oz}$ being the roll and yaw components of the satellite spin vector, respectively, related to the yaw and roll angles, $\phi$ and $\Phi$ respectively, by the equations $h_{ox}=\phi h_w$ and $h_{oz}=-\phi h_w$, $h_w$ being the magnitude of the wheel spin vector; and $K_{ij}^{(h)}$ being amplification parameters.

2. Process for controlling attitude, nutation and momentum of a satellite orbiting in a low earth orbit, with a medium inclination in an earth oriented alignment, said satellite being of the type having an earth sensor for measuring in two axes; a spin wheel having an axis of rotation oriented in parallel to a pitch axis of the satellite and two magnet coils for generating control moments, a first one of the two magnet coils being aligned substantially in parallel to a roll axis of the satellite and a second one of the two magnet coils being aligned substantially in parallel to a yaw axis of the satellite, said process comprising at least one of the steps of:

controlling attitude and nutation of said satellite by activating said magnet coils based on a linear control algorithm which in the case of attitude control is a function of a roll angle measured by the earth sensor and of a yaw angle estimated by means of an observer or measured by an additional sensor on said satellite and, in the case of nutation control, a function of a roll angle change determined by earth sensor measurements and a yaw angle change estimated by the observer or measured by an additional sensor; and controlling wheel spin by activation of at least said first magnet coil, as a function of a deviation from a desired value for spin, and of a yaw component of the earth's magnetic field based on PI feedback control;

wherein said linear control algorithm for nutation control is given by $$\begin{bmatrix} m_x^{(\omega)} \\ m_z^{(\omega)} \end{bmatrix} = \begin{bmatrix} K_{11}^{(\omega)} & K_{13}^{(\omega)} \\ K_{13}^{(\omega)} & K_{33}^{(\omega)} \end{bmatrix} \begin{bmatrix} \omega_x \\ \omega_z \end{bmatrix}$$

$m_x^{(w)}$, $m_x^{(w)}$ being the magnetic moments to be generated by the roll and yaw axis magnet coils; $w_x$ and $w_z$ being the roll and yaw components of the satellite's inertial roting speed vector; and $K_{ij}^{(w)}$ being amplification parameters.

3. Process for controlling attitude, nutation and momentum of a satellite which orbits in a low earth orbit, with a median inclination, said satellite being of the type having an earth sensor for measuring in two axes, a spin wheel having an axis of rotation oriented in parallel to a pitch axis of the satellite, and two magnet coils which are aligned substantially in parallel to the rolling and pitching axis respectively, said process comprising at least one of the steps of:

controlling attitude and momentum of said satellite by activating both of said magnet coils based on a combined linear control algorithm which is a function of a rolling angle of the satellite measured by the earth sensor, a yaw angle estimated by an observer on said satellite and a deviation of the spin from a desired value, the latter being acted upon by a PI-element; and controlling nutation of the satellite by activating at least one of said magnet coils which is aligned in parallel to the pitch axis using a linear control algorithm which is a function of a change of a roll angle of the satellite determined on the basis of earth sensor measurements, and of a yaw angle change estimated by said observer.

* * * * *